United States Patent [19]
Tran et al.

[11] Patent Number: 5,991,869
[45] Date of Patent: Nov. 23, 1999

[54] SUPERSCALAR MICROPROCESSOR INCLUDING A HIGH SPEED INSTRUCTION ALIGNMENT UNIT

[75] Inventors: Thang Tran; David B. Witt; William M. Johnson, all of Austin, Tex.

[73] Assignee: Advanced Micro Devices, Inc., Sunnyvale, Calif.

[21] Appl. No.: 08/968,907

[22] Filed: Nov. 6, 1997

Related U.S. Application Data

[63] Continuation of application No. 08/789,373, Jan. 24, 1997, abandoned, which is a continuation of application No. 08/421,683, Apr. 12, 1995, abandoned.

[51] Int. Cl.⁶ ..................................................... G06F 9/30
[52] U.S. Cl. .......................................... 712/204; 712/205
[58] Field of Search ................................... 395/380, 381, 395/388, 386; 712/204, 205, 212, 210

[56] References Cited

U.S. PATENT DOCUMENTS

| | | |
|---|---|---|
| Re. 35,311 | 8/1996 | Vassiliadis et al. ............ 395/375 |
| 4,044,338 | 8/1977 | Wolf . |
| 4,396,982 | 8/1983 | Wada et al. ..................... 395/375 |
| 4,453,212 | 6/1984 | Gaither et al. . |
| 4,502,111 | 2/1985 | Riffe et al. ..................... 395/775 |
| 4,807,115 | 2/1989 | Torng . |
| 4,858,105 | 8/1989 | Kuriyama et al. . |
| 5,113,515 | 5/1992 | Fite et al. . |
| 5,129,067 | 7/1992 | Johnson . |
| 5,185,868 | 2/1993 | Tran ................................. 395/375 |
| 5,214,763 | 5/1993 | Blaner et al. . |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 467 152 A2 | 1/1992 | European Pat. Off. . |
| 0 498 654 A2 | 8/1992 | European Pat. Off. . |
| 0 651 322 A1 | 5/1995 | European Pat. Off. . |
| 0 690 373 A1 | 1/1996 | European Pat. Off. . |
| 2 263 987 | 8/1993 | United Kingdom . |
| 2263985 | 8/1993 | United Kingdom . |
| 2263987 | 8/1993 | United Kingdom . |
| 2281422 | 3/1995 | United Kingdom . |
| 93/20507 | 10/1993 | WIPO . |

OTHER PUBLICATIONS

Intel, "Chapter 2: Microprocessor Architecture Overview," pages 1–2 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," Byte, Jan. 1996, 4 pages.
International Search Report for PCT/US 96/11759 dated Mar. 7, 1997.

*Primary Examiner*—Zarni Maung
*Attorney, Agent, or Firm*—Conley, Rose & Tayon, PC; B. Noel Kivlin

[57] ABSTRACT

A superscalar microprocessor having an instruction alignment unit, an instruction cache, a plurality of decode units and a predecode unit is provided. The instruction alignment unit transfers a fixed number of instructions from the instruction cache to each of the plurality of decode units. The instructions are selected from a quantity of bytes according to a predecode tag generated by the predecode unit. The predecode tag includes start-byte bits that indicate which bytes within the quantity of bytes are the first byte of an instruction. The instruction alignment unit independently scans a plurality of groups of instruction bytes, selecting start bytes and a plurality of contiguous bytes for each of a plurality of issue positions. Initially, the instruction alignment unit selects a group of issue positions for each of the plurality of groups of instructions. The instruction alignment unit then shifts and merges the independently produced issue positions to produce a final set of issue positions for transfer to the plurality of decode units.

30 Claims, 5 Drawing Sheets

U.S. PATENT DOCUMENTS

| | | | |
|---|---|---|---|
| 5,226,126 | 7/1993 | McFarland et al. | |
| 5,226,130 | 7/1993 | Favor et al. | |
| 5,233,696 | 8/1993 | Suzuki | 395/375 |
| 5,438,668 | 8/1995 | Coon et al. | 395/375 |
| 5,459,844 | 10/1995 | Eickemeyer et al. | 395/375 |
| 5,463,748 | 10/1995 | Schwendinger | |
| 5,465,377 | 11/1995 | Blaner et al. | 395/800 |
| 5,488,729 | 1/1996 | Vegesna et al. | 395/800 |
| 5,504,923 | 4/1996 | Ando | 395/800 |
| 5,513,330 | 4/1996 | Stiles | 395/375 |
| 5,526,510 | 6/1996 | Akkary et al. | 395/460 |
| 5,559,974 | 9/1996 | Boggs et al. | 395/375 |
| 5,566,298 | 10/1996 | Boggs et al. | 395/182.08 |
| 5,826,053 | 10/1998 | Witt | 395/386 |

SUPERSCALAR MICROPROCESSOR INCLUDING A HIGH SPEED INSTRUCTION ALIGNMENT UNIT

This application is a continuation application Ser. No. 08/789,373, filed Jan. 24, 1997, now abandoned which is a continuation of application Ser. No. 08/421,683, filed Apr. 12, 1995, now abandoned.

BACKGROUND OF THE INVENTION

1. Field of the Invention

This invention relates to superscalar microprocessors and more particularly to a high speed instruction alignment unit for dispatching variable byte length instructions to a plurality of instruction decode units within a superscalar microprocessor.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses difficulties in implementing high performance x86 compatible superscalar microprocessors. One difficulty arises from the fact that instructions must be aligned with respect to the parallel-coupled instruction decoders of such processors before proper decode can be effectuated. In contrast to most RISC instruction formats, since the x86 instruction set consists of variable byte length instructions, the start bytes of successive instructions within a line are not necessarily equally spaced, and the number of instructions per line is not fixed. As a result, employment of simple, fixed-length shifting logic cannot in itself solve the problem of instruction alignment. Although scanning logic has been proposed to dynamically and sequentially find the boundaries of instructions during the decode pipeline stage (or stages) of the processor, such a solution typically requires that the decode pipeline stage of the processor be implemented with a relatively large number of cascaded levels of logic gates and/or the allocation of several clock cycles to perform the scanning operation.

A further solution to instruction alignment and decode within x86 compatible superscalar microprocessors is described within the copending, commonly assigned patent application entitled "Superscalar Instruction Decoder", Ser. No. 08/146,383, filed Oct. 29, 1993 by Witt et al., the disclosure of which is incorporated herein by reference in its entirety. Such a solution employs a predecode technique whereby predecode information for each variable byte length instruction is derived as the instructions are stored within an instruction cache. The predecode information is indicative of the boundaries of each instruction, among other things. Prior to dispatch to the decode stage of the processor, an alignment mechanism (referred to as a byte queue) sequentially locates each instruction. Upon locating an instruction, the alignment mechanism translates the instruction into one or more fixed-length RISC-like instructions called "ROPs". The fixed-length ROPs are then provided to allocated instruction decoders. Subsequent instructions are handled similarly. While this solution has been quite successful, it too typically requires a relatively large number of cascaded levels of logic gates and/or pipeline stages. This correspondingly limits the maximum overall clock frequency and performance of the superscalar microprocessor.

SUMMARY OF THE INVENTION

The problems outlined above are in large part solved by a superscalar microprocessor in accordance with the present invention. In one embodiment, the superscalar microprocessor employs an instruction alignment unit which transfers a fixed number of bytes from an instruction cache to each of a plurality of decode units. The bytes are selected from predetermined groups of bytes according to predecode tags generated by a predecode unit. The predecode tags (a separate one of which is associated with each byte) indicate which bytes within the predetermined groups are the starting bytes for instructions. In one specific implementation, the instruction alignment unit concurrently and independently detects the start bytes among three different groups of eight bytes of contiguous instruction code. Upon independently finding a predetermined number of start bytes within each group of instruction code, the instruction alignment unit independently routes the start bytes, along with seven contiguous bytes following each start byte, to respective "preliminary" issue channels associated with each group. The preliminary issue channels are then shifted and/or merged into a set of "final" issue channels coupled to the plurality of decode units mentioned above.

In another embodiment, a superscalar microprocessor is provided in which groups of instruction bytes are transferred to a pair of instruction channelling units. The instruction channelling units independently select up to four start bytes from the instruction bytes and place the selected start bytes and a number of bytes contiguous to and following the start bytes into preliminary issue positions. The instruction bytes channeled through the two sets of preliminary issue positions are then transferred to a third instruction channelling unit, along with an indication of the number of valid instructions contained within the issue positions of the first instruction channelling unit. The issue positions transferred by the second instruction channelling unit are then shifted by the number of valid instructions indicated by the first instruction channeling unit. Final issue positions are then selected from the corresponding valid instructions transferred in the issue positions from the first instruction channelling unit. Any remaining final issue positions are selected from the corresponding issue positions of the shifted set of issue positions from the second channeling unit. The final issue positions are coupled to a set of decode units which decode the instructions and dispatch them to functional units for execution.

In another embodiment, a superscalar microprocessor is provided in which the quantity of bytes that an instruction alignment unit selects from is 24: the last eight bytes of a previously fetched instruction cache line and sixteen bytes of the current instruction cache line. When a start byte is selected for dispatch, the corresponding start bit is invalidated. In this embodiment, up to 4 instructions can be dispatched per clock cycle. When the last eight bytes of the previously fetched cache line and the first eight bytes of the current cache line do not contain any valid start bytes, the current cache line is moved into the previously fetched instruction cache line position and the next instruction cache line is fetched.

Each eight byte section is examined independently for start bytes, and the start bytes found plus the following seven bytes are assigned to an issue position. A first level of multiplexing is implemented to accomplish this. The three sets of issue groups (herein referred to as issue group one for the last eight bytes of the previous cache line, issue group two for the first eight bytes of the current cache line, and issue group three for the last eight bytes of the current cache line) are then directed to a second level of multiplexing. At this level, issue group one and issue group two are merged by shifting issue group two by the number of valid instructions contained in issue group one. The instructions in issue group three are also shifted by the number of valid instructions in issue group one at this level. The merged and shifted issue groups are then directed to a third level of multiplexing. The previously shifted issue group three is further shifted by the number of valid instructions that are contained in issue group two. The double-shifted issue group three is then merged with the previously merged issue groups one and two. The resulting issue groups are transferred to the instruction decode units and the corresponding start bits for the instructions transferred are reset. Also included at the third multiplexing level are the inputs from the MROM unit and the predecode unit.

A superscalar microprocessor according to the present invention may employ an instruction alignment unit. The instruction alignment unit may be implemented in a low number of cascaded gates by scanning several small fields of bytes simultaneously for start bytes, then shifting the independently found instructions by the number of start bytes found within the small fields. No combining of the calculated values is necessary, further speeding the implementation.

Broadly speaking, the invention contemplates a superscalar microprocessor employing an instruction cache, a plurality of decode units, and an instruction alignment unit including a first, a second and a third instruction channelling units. The first and second instruction channelling units are coupled to an input port. The input port comprises a plurality of groups of instruction bytes from the instruction cache. The first instruction channelling unit selects a first plurality of instruction bytes and the second instruction channelling unit selects a second plurality of instruction bytes from the plurality of groups of instructions for dispatch. The first plurality of instruction bytes is then merged with the second plurality of instruction bytes by the third instruction channelling unit, forming a merged plurality of instruction bytes. This merged plurality of instruction bytes is then dispatched to the plurality of instruction decode units through an output port.

BRIEF DESCRIPTION OF THE DRAWINGS

Other objects and advantages of the invention will become apparent upon reading the following detailed description and upon reference to the accompanying drawings in which.

Figure 1:
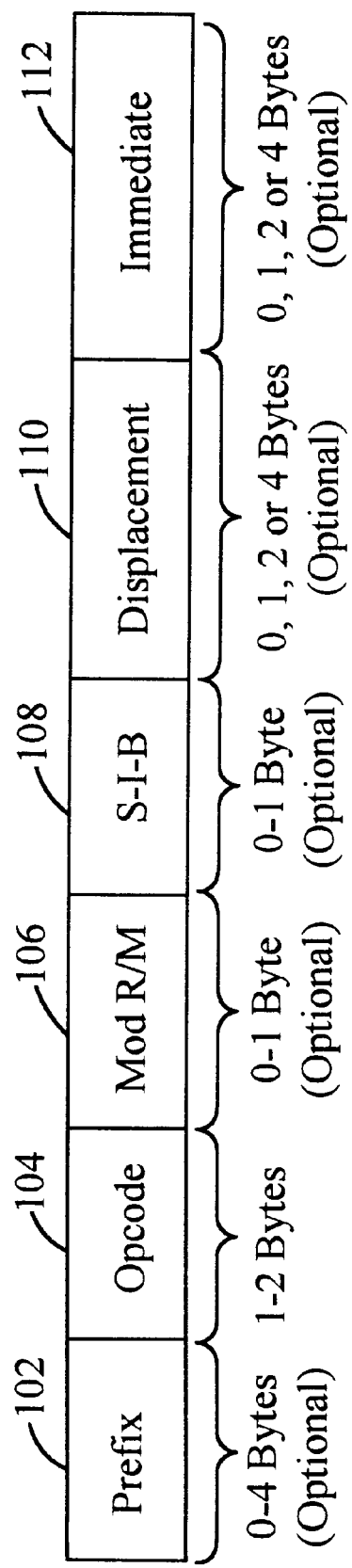
FIG. 1 is a block diagram of a generic x86 instruction format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
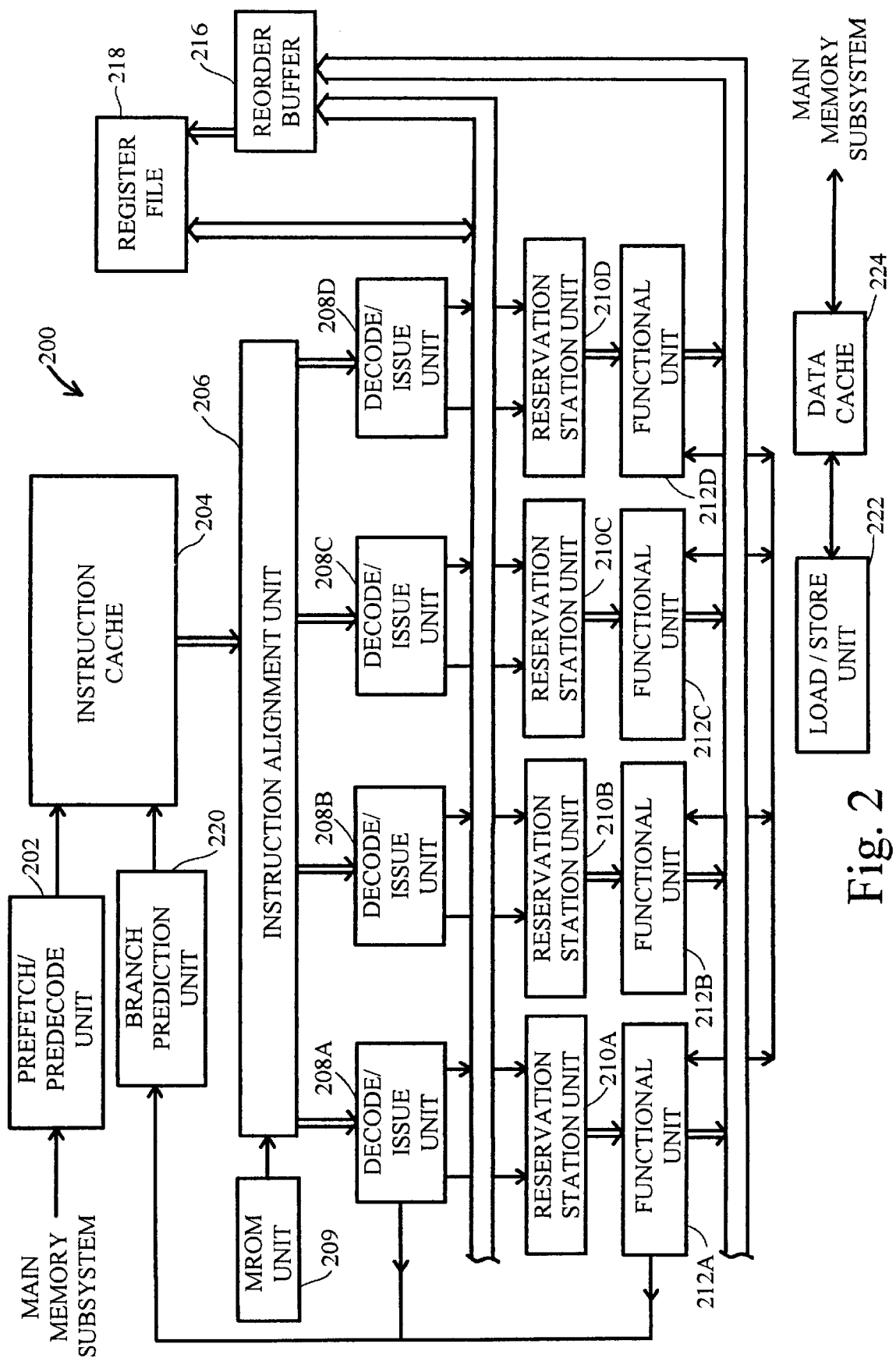
FIG. 2 is a block diagram of a superscalar microprocesor including an instruction alignment unit in accordance with the present invention.

Referring next to FIG. 2, a block diagram of a superscalar microprocessor 200 including an instruction alignment unit 206 in accordance with the present invention is shown. As illustrated in the embodiment of FIG. 2, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208D (referred to collectively as decode units 208). Each decode unit 208A–208D is coupled to respective reservation station units 210A–210D (referred to collectively as reservation stations 210), and each reservation station 210–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |

TABLE 1-continued

Encoding of Start, End and Functional Bits

| Instr. Byte Number | Start Bit Value | End Bit Value | Functional Bit Value | Meaning |
|---|---|---|---|---|
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation. A listing of exemplary x86 instructions categorized as fast path instructions as well as a description of the manner of handling both fast path and MROM instructions will be provided further below.

Instruction alignment unit 206 is provided to channel variable byte length instructions from instruction cache 204 to fixed issue positions formed by decode units 208A–208D. As will be described in conjunction with FIGS. 2–4, instruction alignment unit 206 is configured to channel instruction bytes to designated decode units 208A–208D. Instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the alignment of instructions from instruction cache 204 to decode units 208, general aspects regarding other subsystems employed within the exemplary superscalar microprocessor 200 of FIG. 2 will be described. For the embodiment of FIG. 2, each of the decode units 208 includes decoding circuitry for decoding the predetermined fast path instructions referred to above. In addition, each decode unit 208A–208D routes displacement and immediate data to a corresponding reservation station unit 210A–210D. Output signals from the decode units 208 include bit-encoded execution instructions for the functional units 212 as well as operand address information, immediate data and/or displacement data.

The superscalar microprocessor of FIG. 2 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208D are routed directly to respective reservation station units 210A–210D. In one embodiment, each reservation station unit 210A–210D is capable of holding instruction information (i.e., bit encoded execution bits as well as operand values, operand tags and/or immediate data) for up to three pending instructions awaiting issue to the corresponding functional unit. It is noted that for the embodiment of FIG. 2, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions. Each of the four reservation stations 210A–210D contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a store buffer with eight storage locations for data and address information for pending loads or stores. Functional units 212 arbitrate for access to the load/store unit 222. When the buffer is full, a functional unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Figure 3A:
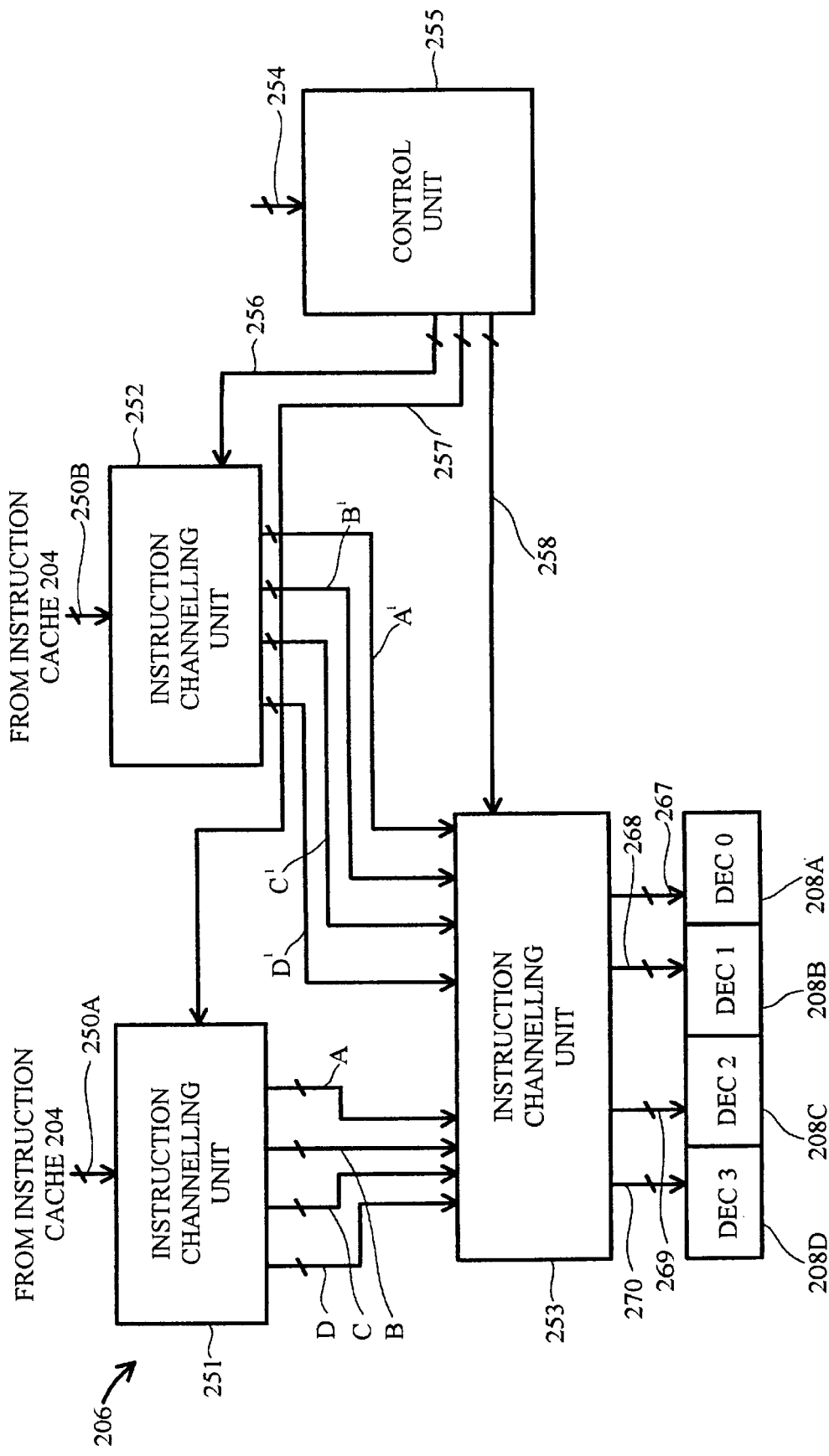
FIG. 3A is a block diagram of one embodiment of the instruction alignment unit in accordance with the present invention.

Details regarding the dispatch of instructions from instruction cache 204 through instruction alignment unit 206 to decode units 208 will next be considered. FIG. 3A is a block diagram which depicts internal portions of one embodiment of instruction alignment unit 206 as well as input registers to decode units 208. This embodiment is configured with two instruction byte buses 250A and 250B (collectively referred to as instruction byte buses 250). Instruction bytes are placed on instruction byte buses 250 by instruction cache 204, and each instruction byte bus transfers eight bytes. Instruction byte bus 250A is coupled to an instruction channelling unit 251 and instruction byte bus 250B is coupled to an instruction channelling unit 252. Also shown in FIG. 3A is a control unit 255 which receives input information on a predecode tag bus 254 and has control output buses 256, 257, and 258. Control output bus 256 is coupled to instruction channelling unit 252. Similarly, control output bus 257 is coupled to instruction channelling unit 251 and control output bus 258 is coupled to an instruction channelling unit 253. Instruction channelling unit 251 produces four preliminary issue positions: preliminary issue position A, preliminary issue position B, preliminary issue position C, and preliminary issue position D. Similarly, instruction channelling unit 252 produces preliminary issue position A', preliminary issue position B', preliminary issue position C', and preliminary issue position D'. Each of the preliminary issue positions A–D and A'–D' are coupled to instruction channelling unit 253. Instruction channelling unit 253 produces four final issue positions 267, 268, 269, and 270 which are coupled to decode units 208A, 208B, 208C and 208D, respectively. In this embodiment, each preliminary or final issue position conveys at most one valid instruction, and conveys a fixed number of bytes that include the valid instruction.

Generally speaking, instruction channelling units 251 and 252 independently and in parallel select instructions from instruction byte busses 250A and 250B, respectively. Selected instructions fill preliminary issue positions connected to instruction channeling units 251 and 252. Instruction channelling unit 253 shifts instructions conveyed in preliminary issue positions A'–D' by the number of instructions conveyed in preliminary issue positions A–D. Instruction channelling unit 253 then merges the instructions from the two sets of preliminary issue positions into final issue positions 267–270. The instruction selection and shifting process is explained in more detail in the following paragraphs.

In this embodiment, control unit 255 receives (via bus 254) the start byte bits associated with the instruction bytes transferred on instruction byte buses 250. Control unit 255 scans the start byte information for instruction byte bus 250A, searching for start byte bits that are set. When a start byte bit is set, the corresponding byte on instruction byte bus 250A is the start of an instruction. Control unit 255 directs (via signals on control output bus 257) instruction channelling unit 251 to select the corresponding byte and the following seven bytes on input instruction byte bus 250A. The bytes selected fill the next available preliminary issue position. Preliminary issue position A is filled first, then preliminary issue position B, etc. Control unit 255 continues scanning the start byte bits associated with instruction byte bus 250A until either the issue positions of instruction channelling unit 251 are filled or the start byte bits associated with instruction byte bus 250A are exhausted. Similarly and in parallel, control unit 255 processes start byte bits associated with instruction byte bus 250B and conveys issue position selection information to instruction channelling unit 252 on control output bus 256.

For the embodiment of FIG. 3A, the instructions transferred on instruction byte bus 250A are higher priority than instructions transferred on instruction byte bus 250B. Therefore, valid instructions conveyed in preliminary issue positions A–D are directed to final issue positions 267–270 by instruction channelling unit 253 under the direction of control unit 255. Preliminary issue position A, when conveying a valid instruction, is directed to issue position 267. Similarly, preliminary issue position B, when conveying a valid instruction, is directed to issue position 268, etc. Additionally, instruction channelling unit 253 shifts preliminary issue positions A'–D' by the number of valid instructions selected by instruction channelling unit 251 (i.e. the number of valid instructions conveyed in issue positions A–D). The shifted preliminary issue positions thereafter fill those final issue positions 267–270 which were not filled with instructions from preliminary issue positions A–D. Therefore, decode units 208 receive the maximum number of instructions (up to four) that could be located within instruction byte busses 250.

The operation of this embodiment will be further illustrated by use of an example. Assume that instruction byte bus 250A transfers two valid instructions in a clock cycle, and instruction byte bus 250B also transfers two valid instructions in that same clock cycle. Instruction channelling unit 251, under the direction of control unit 255, selects the first start byte and the following seven bytes from instruction byte bus 250A and fills preliminary issue position A with the selected bytes. Control unit 255 then detects the second start byte of instruction byte bus 250A, and directs instruction channelling unit 251 to cause the second start byte and the following seven bytes to occupy preliminary issue position B. Independently and in parallel with the above, control unit 255 scans the start byte bits associated with the instruction bytes provided on instruction byte bus 250B, and detects the first start byte. The detected start byte and the following seven bytes fill preliminary issue position A'. Continuing the scanning process, control unit 255 detects the second start byte conveyed on instruction byte bus 250B. The second start byte and the following seven bytes are selected by instruction channelling unit 252 into preliminary issue position B'. It is noted that the scanning mechanism of control unit 255 may also find subsequent instructions on instruction byte bus 250B which are routed to preliminary issue positions C' and D'. As will be evident from the following, however, issue positions C' and D' will be essentially ignored by instruction channeling unit 253.

Next, control unit 255 directs instruction channelling unit 253 via control output 258. Since two valid instructions reside in preliminary issue positions A–B, preliminary issue position A and preliminary issue position B fill final issue positions 267 and 268, respectively. Also, because two valid instructions were selected in instruction channelling unit 251, preliminary issue positions A'–D' are shifted by two positions. The shifting aligns the instruction conveyed in issue position A' with final issue position 269. Similarly, issue position B' is aligned with final issue position 270. Therefore, the two valid instructions, originally in preliminary issue positions A' and B', fill final issue positions 269 and 270, respectively. Each of decode units 208 receive an instruction in this cycle.

In another embodiment, the bytes selected to fill one preliminary issue position at the output of instruction channelling units 251 and 252 may overlap the bytes selected to fill another preliminary issue position. The number of bytes filling a preliminary or final issue position is fixed, and some instructions may not occupy the full number of bytes within the issue position. Therefore, the start byte and possibly other bytes of a following instruction occupy byte positions within the current issue position. Each of decode units 208 receive the start byte and end byte bits associated with the instruction transferred to the decode unit. Decode units 208 detect the start and end byte bits to determine which of the bytes transferred comprise a complete valid instruction.

It is understood that other embodiments may employ different numbers of issue positions and decode units. The embodiment described in conjunction with FIG. 3A may be implemented with a small number of cascaded logic levels, thereby allowing the embodiment to operate at high speed. The embodiment can be implemented in a small number of cascaded logic levels for a variety of reasons. First, the large number of instructions transferred on instruction byte buses 250 are processed in small groups independent of each other. Instead of scanning linearly through the start bit information associated with this large number of instructions, the small groups can be processed in parallel. Second, the small groups are combined together based on the number of valid instructions found in one of the small groups (instruction byte bus 250A, in this embodiment).

Figure 3B:
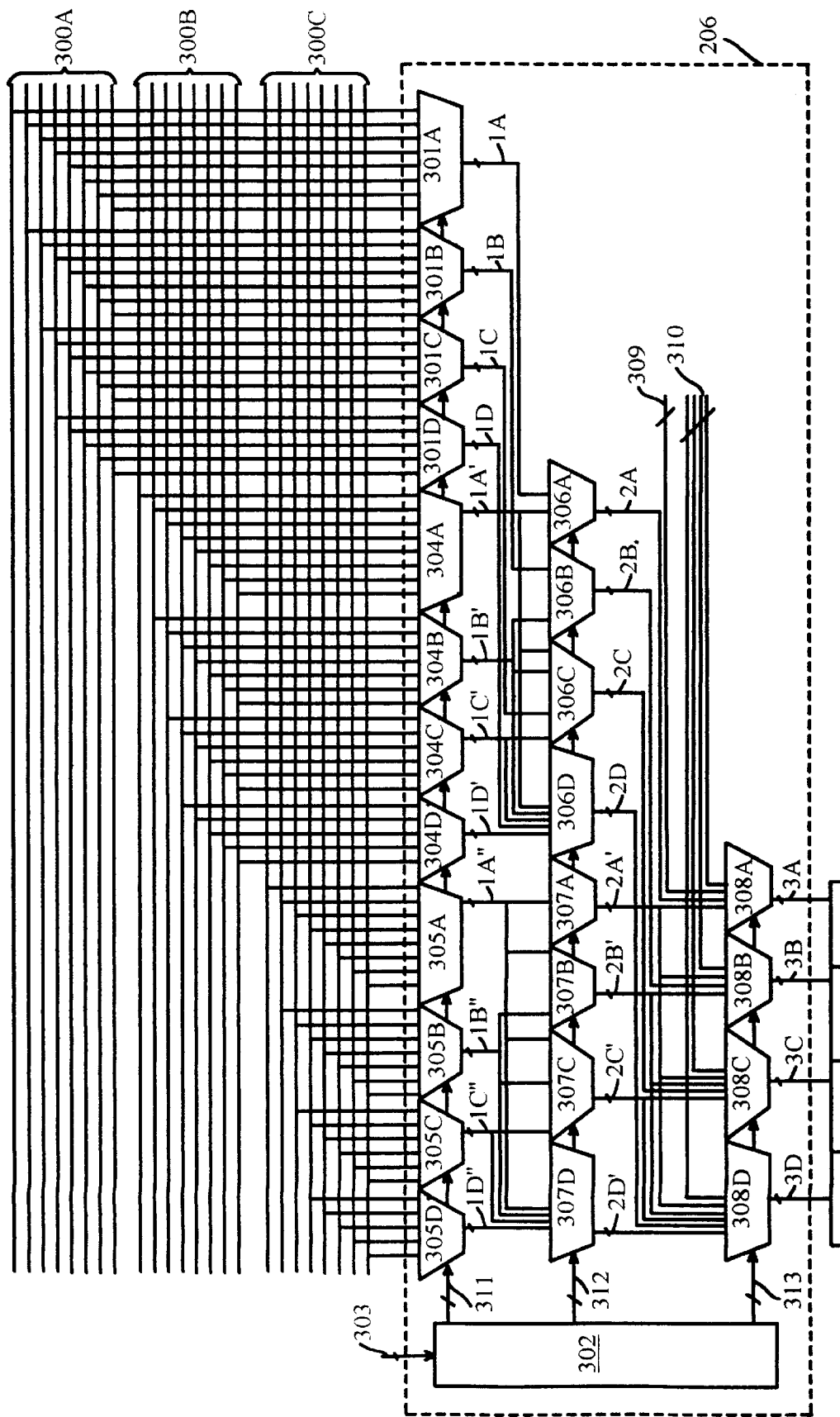
FIG. 3B is a diagram of another embodiment of the instruction alignment unit in accordance with the present invention, showing only the start bytes connection to the first level of multiplexing.

Turning now to FIG. 3B, another embodiment of instruction alignment unit 206 is shown. The instruction channelling units of this embodiment include multiplexors, and are controlled by output control unit 302 via multiplexor control buses 311, 312, and 313. Three instruction byte buses 300A, 300B, and 300C (collectively referred to herein as instruction byte buses 300) are further shown. Instruction byte bus 300A conveys the last eight instruction bytes from a "previously" fetched instruction cache line. Input instruction byte bus 300B conveys the first eight bytes of the "most current" instruction cache line, and input instruction byte bus 300C conveys the last eight bytes of the most current instruction cache line. When the instructions from the last eight bytes of the previously fetched cache line and the first eight bytes of the most current cache line have been transferred to decode units 208, the last eight bytes of the most current cache line are moved to the last eight bytes of the previously fetched instruction cache line (i.e., to instruction byte bus 300A), and a new cache line is fetched (and conveyed on instruction byte buses 300B and 300C).

Referring to FIG. 3B, signal paths between input instruction byte buses 300 and first level multiplexors 301A, 301B, 301C, 301D, 304A, 304B, 304C, 304D, 305A, 305B, 305C, and 305D (collectively referred to herein as multiplexors 301, 304, and 305, respectively) are shown. As opposed to the previous embodiment which had two first level instruction channelling units, this embodiment has three first level instruction channelling units as represented by multiplexors 301, 304, and 305, respectively. The first level instruction channelling units have issue positions 1A–1D, 1A'–1D', and 1A"–1D" associated with them, as indicated on FIG. 3B. FIG. 3B also depicts signal paths between first level multiplexors 301, 304 and 305 and second level multiplexors 306A, 306B, 306C, 306D, 307A, 307B, 307C, and 307D (collectively referred to herein as multiplexors 306 and 307, respectively). Multiplexors 306 and 307 form two second level instruction channelling units. The second level instruction channelling units have issue positions 2A–2D and 2A'–2D' associated with them. Finally, signal paths between second level multiplexors 306 and 307 and third level multiplexors 308A, 308B, 308C, and 308D (collectively referred to herein as multiplexors 308) are shown. Multiplexors 308 form a third level instruction channelling unit. The third level instruction unit has issue positions 3A–3D associated with it.

Broadly speaking, each of the first level instruction channelling units formed by multiplexors 301, 304, and 305 independently and in parallel select instructions from their associated instruction byte bus 300A–300C into issue positions 1A–1D, 1A'–1D', and 1A"–1D", respectively. The second level instruction channelling units formed by multiplexors 306 and 307 shift issue positions 1A'–1D' and 1A"–1D", respectively, by the number of valid instructions within issue positions 1A–1D. Additionally, multiplexors 306 merge issue positions 1A–1D with the shifted issue positions associated with issue positions 1A'–1D'. The third level instruction channelling unit formed by multiplexors 308 shifts issue positions 2A'–2D' by the number of instructions in issue positions 1A'–1D'. Also, multiplexors 308 merge issue positions 2A–2D with the shifted issue positions associated with issue positions 2A'–2D'. A more complete description of this embodiment is provided next.

In FIG. 3B, only the signal paths for multiplexing of the start bytes are shown. However, as indicated by the slashes on the outputs of the first level multiplexors, multiple bytes are selected by each multiplexor. The multiplexing for the other bytes that are selected for a given multiplexor will be shown below with respect to FIG. 4. The first level multiplexors are grouped according to the instruction byte bus 300 that they are coupled to. Accordingly, multiplexors 301 are coupled to instruction byte bus 300A; multiplexors 304 are coupled to instruction byte bus 300B; and multiplexors 305 are coupled to instruction byte bus 300C. In one embodiment, multiplexor 301A is coupled to the eight instruction bytes of instruction byte bus 300A. This allows for a start byte to be selected from any byte conveyed within instruction byte bus 300A. Multiplexor 301B is coupled to each of the bytes of instruction byte bus 300A except for the first byte. Multiplexor 301B need not be coupled to the first byte; if that byte is a start byte then it will be selected by multiplexor 301A. Similarly, multiplexor 301C need not be coupled to the first two bytes. If both bytes are start bytes, the first byte will be selected by multiplexor 301A and the second byte will be selected by multiplexor 301B. Lastly, multiplexor 301D is shown coupled to each of the bytes instruction byte bus 300A except for the first three bytes. Thus, the combination of multiplexors 301A, 301B, 301C, and 301D and the corresponding signal paths from instruction byte bus 300A allow for up to four start bytes to be selected from instruction bus 300A.

As FIG. 3B further illustrates, similar signal paths as outlined from instruction byte bus 300A to multiplexors 301 are shown between input instruction byte bus 300B and multiplexors 304. These multiplexors are configured similar to multiplexors 301, wherein: multiplexor 304A is similar to 301A; 304B is similar to 301B; 304C is similar to 301C, and 304D is similar to 301D. Also, the operation of multiplexors 304 is independent of and occurs in parallel with the operation of multiplexors 301. The signal paths between instruction byte bus 300C and multiplexors 305 are again similar to those between instruction byte bus 300A and multiplexors 301.

A control unit 302 is coupled to multiplexors 301, 304, and 305 via multiplexor control bus 311. Control unit 302 is further configured with a predecode tag input port 303. Input port 303 conveys information that control unit 302 uses to direct the selection by multiplexors 301, 304, and 305 of instruction bytes from instruction byte buses 300. In one embodiment, the information conveyed on input port 303 includes the start byte bits associated with the bytes being provided on instruction byte buses 300. The start byte information is scanned by control unit 302 and is used to create signals conveyed on multiplexor control bus 311. The first start byte detected by scanning the start byte bits associated with the instruction bytes conveyed on instruction byte bus 300A is selected by multiplexor 301A along with the following seven bytes. The bytes selected by multiplexor 301A will extend to the instruction bytes conveyed on instruction byte bus 300B, if necessary. Similarly, the second start byte detected is selected by multiplexor 301B along with the following seven bytes. Again, the bytes selected by multiplexor 301B will extend to the instruction bytes conveyed on instruction byte bus 300B, if necessary. Control unit 302 continues scanning until four start bytes have been detected, or until the start byte bits associated with the instruction bytes conveyed on instruction byte bus 300A are exhausted.

Control unit 302 scans the start byte bits associated with the instruction bytes conveyed on instruction byte bus 300B and the start byte bits associated with the instruction bytes conveyed on instruction byte bus 300C in parallel with and independent of the aforementioned scanning. Similar procedures are followed for selecting bytes from instruction byte bus 300B and instruction byte bus 300C using multiplexors 304 and 305, respectively.

Using the issue positions as defined above, the function of the second level multiplexors 306 and 307 can be described. Broadly speaking, multiplexors 306 are configured to merge the issue positions 1A–1D with issue positions 1A'–1D' to form issue positions 2A–2D under the direction of control unit 302. The merging function is performed by shifting issue positions 1A'–1D' by the number of valid instructions in issue positions 1A–1D; and then filling issue positions 2A–2D with any valid instructions from issue positions 1A–1D and filling the remaining issue positions 2A–2D from the shifted issue positions created from issue positions 1A'–1D'. Multiplexors 307 shift issue positions 1A"–1D" by the number of valid instructions in issue positions 1A–1D under the direction of control unit 302, thereby filling issue positions 2A'–2D'. As discussed here, the multiplexor control bus 312 for multiplexors 306 and 307 depend on the number of valid instructions in issue positions 1A–1D.

Multiplexors 308 are configured to merge issue positions 2A–2D and 2A'–2D' into issue positions 3A–3D under the direction of control unit 302. The merging function performed by multiplexors 308 is accomplished by shifting issue positions 2A'–2D' by the number of valid instructions in issue positions 1A'–1D', then filling issue positions 3A–3D with any valid instructions in issue positions 2A–2D and filling the remaining issue positions 3A–3D from the shifted issue positions created from issue positions 2A'–2D'. The instructions contained in issue positions 3A–3D are transferred to decode units 208. The start byte bits corresponding to the instructions transferred to decode units 208 are reset, so that further instructions may be processed in the next cycle.

In another embodiment, the start bits of instructions following a branch instruction which is predicted taken are reset by branch prediction unit 220. Therefore, in one case the start bits associated with instruction bytes conveyed on instruction byte bus 300A are reset (because the instructions have been dispatched to decode units 208) and the start bits associated with instruction bytes conveyed on instruction byte bus 300C are reset (because the instructions bytes conveyed on instruction byte bus 300B contain a branch instruction which is predicted taken). In this case, the instruction bytes conveyed on instruction byte bus 300B are moved to instruction byte bus 300A and a new cache line is fetched from the target of the predicted branch instruction.

In one embodiment, multiplexors 308 also have inputs from predecode unit 202 and the MROM unit 209. The input from predecode unit 202 is shown in FIG. 3B as 309. The inputs from MROM unit 209 are shown in FIG. 3B as 310. MROM inputs 310 are used to allow MROM unit 209 to transfer MROM instructions into decode units 208. Predecode input 309 is used when an instruction fetch misses instruction cache 204. In this case, instructions are read from main memory and predecoded by predecode unit 202 (one instruction per clock cycle). Instead of waiting until the instruction cache line completes predecode and is stored in the instruction cache, microprocessor 200 routes the predecode instructions to decode units 208 using predecode input 309.

Valid instructions fill issue positions in a fashion such that, within any group of issue positions, the position denoted as A is filled first, then the position denoted as B, etc. For example issue position 1B will not contain a valid instruction unless issue position 1A contains a valid instruction. Also, issue position 2B' will not contain a valid instruction if issue position 2A' does not contain a valid instruction.

The merging and shifting operations performed by multiplexors 306, 307, and 308 will be further illuminated through an example. For this example, issue positions 1A and 1B convey valid instructions, and issue positions 1C and 1D do not convey valid instructions. Further, issue position 1A' conveys a valid instruction, and issue positions 1B', 1C' and 1D' do not convey valid instructions. Lastly, issue position 1A" conveys a valid instruction, and issue positions 1B", 1C", and 1D" do not convey valid instructions.

In this example, issue positions 1A'–1D' and 1A"–1D" would be shifted by 2, which is the number of valid instructions in issue positions 1A–1D. The shifting for issue positions 1A'–1D' and 1A"–1D" is performed by multiplexors 306 and 307, respectively. Therefore, control unit 302 directs, via multiplexor control bus 312, multiplexor 306A to select the bytes from multiplexor 301A (issue position 1A); multiplexor 306B to select the bytes from multiplexor 301B (issue position 1B); and multiplexor 306C to select the bytes from multiplexor 304A (issue position 1A'). Multiplexor 306D does not select a valid instruction in this example. Thus, issue positions 1A–1D and 1A'–1D' have been merged. Three valid instructions exist in issue positions 2A–2D. Furthermore, control unit 302 directs multiplexors 307A, 307B and 307D not to select valid instructions. Control unit 302 directs multiplexor 307C to select the bytes from multiplexor 305A (issue position 1A"). In this manner, issue positions 2A'–2D' contain issue positions 1A"–1D" shifted by the number of valid instructions in issue positions 1A–1D.

Continuing the example, control unit 302 further directs multiplexors 308A, 308B, 308C, and 308D to select bytes from multiplexors 306A (issue position 2A), 306B (issue position 2B), 306C (issue position 2C), and 307C (issue position 2C'), respectively. In this manner, issue positions 2A'–2D' are shifted by the number of valid instructions in issue positions 1A'–1D' (i.e. 1). A final set of decode positions 3A–3D has been created. As can be seen from this example, four valid instructions from three different sets of instruction bytes were selected for decoding this cycle. Advantageously, four decode positions were used.

It is noted that the bytes selected by various multiplexors 301, 304, and 305 may overlap. For example, multiplexor 301A may be directed by control unit 302 to select the eight bytes conveyed on instruction byte bus 300A. However, the second byte of instruction byte bus 300A may also be a start byte. In this case, control unit 302 will direct multiplexor 301B to select the second byte through the eighth byte of instruction byte bus 300A and the first byte of instruction byte bus 300B. Therefore, the second byte through the eighth byte of instruction byte bus 300A are selected by both multiplexor 301A and multiplexor 301B. Start-byte and end-byte information is conveyed to the decode units 208 so that they can determine which of the eight received bytes represents the instruction. The bytes contained between the start-byte and the end-byte, inclusive, will be decoded by the decode unit that receives the selected bytes. If no start-byte and/or no end-byte is detected by the decode units 208, then the bytes are transferred back to predecode unit 202 (shown in FIG. 2) for predecoding. If the functional bit, as defined above, indicates the instruction is an MROM instruction, then the bytes are transferred to the MROM unit 209 (shown in FIG. 2) for further processing.

It is noted that the effect of shifting occurs due to the manner in which inputs are coupled to the groups of multiplexors and the manner in which the select signals conveyed on the multiplexor control buses are generated. For example, consider multiplexor 306B as shown in FIG. 3B. Multiplexor 306B is configured with three inputs: the outputs of multiplexors 301B, 304A, and 304B. Therefore, multiplexor 306B selects between issue positions 1B, 1A', and 1B'. In the case where one instruction is valid in issue positions 1A–1D, multiplexor 306B will be directed to select issue position 1A'. Therefore, the first issue position of multiplexors 304 has been shifted to the second issue position of multiplexors 306.

The embodiment of FIG. 3B selects valid instructions first from instruction byte bus 300A, then from instruction byte bus 300B, and finally from instruction byte bus 300C into final issue positions 3A–3D. This methodology is employed because the input instruction byte bus 300A contains the oldest pending instructions, and so it is generally advantageous to decode (and later execute) these instructions first so that new instructions can become visible to the decoding mechanism. In other embodiments, the input instruction byte buses 300 might be configured differently, and so different mechanisms for selecting instructions might be employed. The number and size of groups of input instruction bytes may also vary from embodiment to embodiment, and are not necessarily related to instruction cache lines. In fact, unrelated groups of instruction bytes could be presented on input instruction byte buses 300. It is understood that other embodiments may have differing numbers of instruction channelling units. It is further understood that the number of start bytes (and therefore the number of instructions) selected from an instruction byte bus may vary from embodiment to embodiment.

Figure 4:
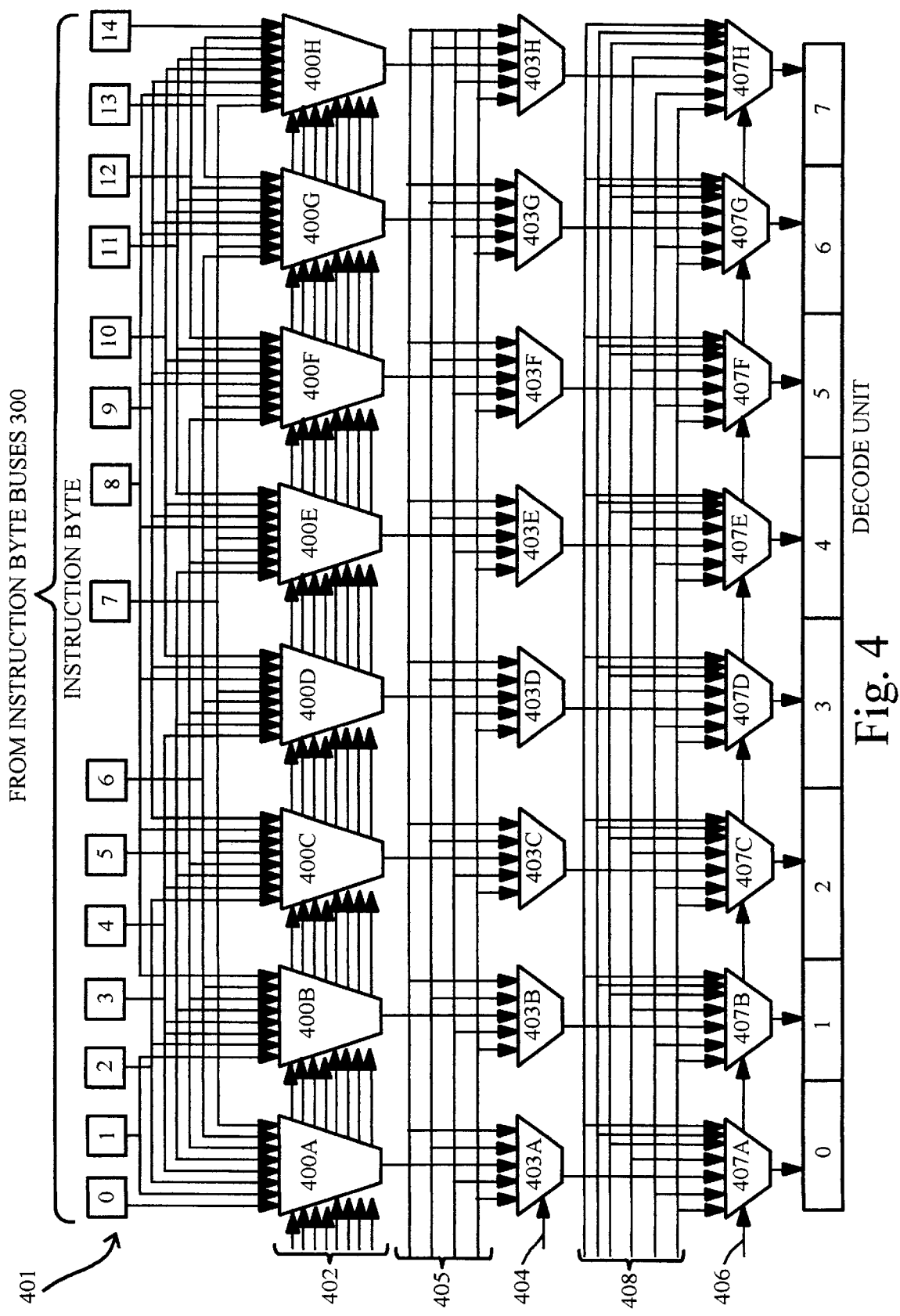
FIG. 4 is a diagram showing 15 contiguous instruction bytes and the multiplexing connections necessary to select 8 contiguous bytes within the set of 15 instruction bytes.

Turning now to FIG. 4, signal paths to transfer a set of contiguous bytes from instruction byte buses 300 (shown in FIG. 4) to a decode unit is shown. As mentioned above, only the start byte signal paths were shown in FIG. 3B. As with FIG. 3B, three levels of multiplexors are shown in FIG. 4. A first level of multiplexors 400A, 400B, 400C, 400D, 400E, 400F, 400G and 400H (collectively referred to herein as multiplexors 400) are coupled to a set of contiguous instruction bytes 401. Instruction bytes 401 originate on instruction buses 300. Multiplexor control bus 402 (a subset of control bus 311) is coupled to multiplexors 400. The start byte is selected in multiplexor 400A, the next contiguous byte in multiplexor 400B, etc. For example, if instruction byte one is a start byte, instruction byte one will be selected by multiplexor 400A, instruction byte two will be selected by multiplexor 400B, etc.

A second level of multiplexors is shown in FIG. 4 as multiplexors 403A, 403B, 403C, 403D, 403E, 403F, 403G, and 403H (collectively referred to herein as multiplexors 403). Coupled as inputs to multiplexors 403 are the outputs of multiplexors 400. Also coupled as inputs to multiplexors 403 are inputs 405. Inputs 405 are coupled to multiplexor circuits (not shown) similar to multiplexors 400, which are coupled to different control buses similar to control bus 402 but which select different bytes from instruction bus 300. For example, such select controls may be generated by finding a different start byte bit than the start byte bit which generates control bus 402. Multiplexors 403 are further coupled to multiplexor control bus 404, which is a subset of the control bus 312 shown in FIG. 3B.

The outputs of multiplexors 403 are coupled as inputs to multiplexors 407A, 407B, 407C, 407D, 407E, 407F, 407G, and 407H (collectively referred to herein as multiplexors 407). Also coupled as inputs to multiplexors 407 are inputs 408. Inputs 408 are coupled to multiplexor circuits (not shown) similar to multiplexors 403 (which are coupled to different control buses which are similar to control bus 404). In one embodiment, inputs 408 also contain MROM inputs from MROM unit 209 (shown in FIG. 2) and inputs from predecode unit 202 (shown in FIG. 2). Also coupled to multiplexors 407 is multiplexor control bus 406, which is a subset of control bus 313 shown in FIG. 3B. The outputs of multiplexors 407 are coupled to the input bytes of one of the decode units 208.

Further details regarding other aspects of a superscalar microprocessor may be found in the commonly assigned, co-pending patent application entitled "High Performance Superscalar Instruction Alignment Unit", Ser. No. 08/377, 865, filed Jan. 25, 1995, by Tran, et al. This patent application is incorporated herein by reference in its entirety.

In accordance with the foregoing description, a high performance instruction alignment unit has been disclosed. The instruction alignment unit employs multiple independent scan and shift units (instruction channelling units) to select instructions for dispatch. The method and apparatus described herein allows implementation in a small number of cascaded levels of logic gates, rendering the unit especially useful in high speed designs. Furthermore, the instruction alignment alignment unit achieves high performance by scanning a wide range of bytes for instructions to execute.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising:
    an instruction alignment unit for transferring instructions from an instruction cache to a plurality of decode units, wherein said instruction alignment unit includes:
        an input port configured to transfer a plurality of groups of instruction bytes from said instruction cache;
        a first instruction channelling unit coupled to said input port wherein said first instruction channelling unit is configured to select a first plurality of instruction bytes from a first of said plurality of groups of instruction bytes transferred by said input port;
        a second instruction channelling unit coupled to said input port wherein said second instruction channelling unit is configured to select a second plurality of instruction bytes from a second of said plurality of groups of instruction bytes transferred by said input port;
        a third instruction channelling unit coupled to said first instruction channelling unit and to said second instruction channelling unit wherein said third instruction channelling unit is configured to merge said first plurality of instruction bytes and said second plurality of instruction bytes into a merged plurality of instruction bytes; and
        an output port coupled to said third instruction channelling unit wherein said output port is configured to transfer a plurality of instruction bytes to said plurality of decode units;
    said instruction cache for storing previously fetched instruction blocks coupled to said instruction alignment unit wherein said instruction cache comprises a plurality of blocks of memory; and
    said plurality of decode units for decoding said plurality of instruction bytes transferred from said instruction alignment unit, coupled to said instruction alignment unit.

2. The superscalar microprocessor as recited in claim 1 wherein said input port is further configured to transfer a plurality of groups of instruction bytes which are stored in a plurality of blocks of memory wherein a first of said plurality of blocks of memory and a second of said plurality of blocks of memory are contiguous.

3. The superscalar microprocessor as recited in claim 1 wherein said first instruction channelling unit of said instruction alignment unit and said second instruction channelling unit of said instruction alignment unit are further configured to independently select said first plurality of instruction bytes and said second plurality of instruction bytes.

4. The superscalar microprocessor as recited in claim 3 wherein said first instruction channelling unit of said instruction alignment unit, said second instruction channelling unit of said instruction alignment unit, and said third instruction channelling unit of said instruction alignment unit further comprise pluralities of multiplexors.

5. The superscalar microprocessor as recited in claim 4 wherein said merged plurality of instruction bytes comprises said first plurality of instruction bytes followed by said second plurality of instruction bytes, such that said second plurality of instruction bytes have been shifted by the number of bytes in said first plurality of instruction bytes.

6. The superscalar microprocessor as recited in claim 5 wherein said plurality of instruction bytes transferred by said output port is said merged plurality of instruction bytes.

7. The superscalar microprocessor as recited in claim 6 wherein said instruction alignment unit further includes a control unit coupled to said first instruction channelling unit, said second instruction channelling unit, and said third instruction channelling unit wherein said control unit is configured to direct said first instruction channelling unit to select said first plurality of instruction bytes.

8. The superscalar microprocessor as recited in claim 7 wherein said control unit of said instruction alignment unit is further configured to direct said second instruction channelling unit to select said second plurality of instruction bytes.

9. The superscalar microprocessor as recited in claim 8 wherein said control unit of said instruction channelling unit is further configured to direct said third instruction channelling unit to select said merged plurality of instruction bytes.

10. The superscalar microprocessor as recited in claim 9 wherein said control unit further comprises a control input port, and wherein said control unit is further configured to direct said first instruction channelling unit, said second instruction channelling unit, and said third instruction channelling unit according to information provided on said control input port.

11. The superscalar microprocessor as recited in claim 10 wherein said information provided on said control input port is start byte and end byte bits identifying start instruction bytes and end instruction bytes within said plurality of groups of instruction bytes of said input port.

12. The superscalar microprocessor as recited in claim 11 wherein said control unit is further configured to direct said first instruction channelling unit to select a byte within said first of said plurality of groups of instruction bytes to be included in said first plurality of instruction bytes, and wherein said byte is a start byte.

13. The superscalar microprocessor as recited in claim 12 wherein said control unit is further configured to direct said first instruction channelling unit to select a plurality of bytes contiguous to said start byte to be included in said first plurality of instruction bytes.

14. The superscalar microprocessor as recited in claim 13 wherein said output port of said instruction alignment unit is configured to transfer said byte and said contiguous bytes to one of said plurality of decode units.

15. The superscalar microprocessor as recited in claim 1 wherein said instruction alignment unit further includes a fourth instruction channelling unit coupled to said input port wherein said fourth instruction channelling unit is further configured to select a third plurality of instruction bytes from a third of said plurality of groups of instruction bytes transferred by said input port.

16. The superscalar microprocessor as recited in claim 15 wherein said instruction alignment unit further includes a fifth instruction channelling unit coupled to said fourth instruction channelling unit wherein said fifth instruction channelling unit is configured to shift said third plurality of instruction bytes by the number of bytes in said first plurality of instruction bytes, thereby forming a shifted plurality of instruction bytes.

17. The superscalar microprocessor as recited in claim 16 wherein said instruction alignment unit further includes a sixth instruction channelling unit coupled to said fifth instruction channelling unit and further coupled to said third instruction channelling unit wherein said sixth instruction channelling unit is configured to merge said merged plurality of instruction bytes and said shifted plurality of instruction bytes into a second merged plurality of instruction bytes, and wherein said second merged plurality of instruction bytes is said merged plurality of instruction bytes followed by said third plurality of instruction bytes, such that said shifted plurality of instruction bytes is further shifted by the number of bytes in said second plurality of instruction bytes.

18. The superscalar microprocessor recited in claim 17 wherein said plurality of instruction bytes transferred by said output port is said second merged plurality of instruction bytes.

19. The superscalar microprocessor as recited in claim 18 further comprising:
   a prefetch/predecode unit coupled to said instruction cache for prefetching and predecoding instructions from a main memory;
   a branch prediction unit coupled to said instruction cache for predicting the target address of branch instructions;
   an MROM unit coupled to said instruction alignment unit for microcoding difficult instructions;
   a plurality of reservation stations coupled to said plurality of decode units for storing decoded instructions until one of a plurality of functional units is available to execute said decoded instructions and said decoded instructions have been provided with their operands;
   said plurality of functional units coupled to said plurality of reservation stations for executing said decoded instruction stored in said plurality of reservation stations;
   a load/store unit coupled to said plurality of functional units and said plurality of decode units for executing load/store instructions;
   a data cache coupled to said load/store unit for storing previously fetched data memory locations;
   a reorder buffer coupled to said plurality of functional units, said load/store unit, and said plurality of decode units wherein said reorder buffer stores speculatively executed results until said results are no longer speculative; and
   a register file coupled to said plurality of decode units and said reorder buffer for storing the non-speculative state of the register set.

20. A superscalar microprocessor comprising:
   a plurality of decode units;
   an instruction cache; and
   an instruction alignment unit for aligning variable byte length instructions and for transferring said variable byte length instructions from said instruction cache to said plurality of decode units, wherein said instruction alignment unit includes:
      a first instruction channelling unit coupled to said instruction cache and configured to select a first plurality of instruction bytes from a first of a plurality of groups of instruction bytes;
      a second instruction channelling unit coupled to said instruction cache and configured to select a second plurality of instruction bytes from a second of said plurality of groups of instruction bytes;
      a third instruction channelling unit having a first input coupled to said first instruction channelling unit and a second input coupled to said second instruction channelling unit wherein said third instruction channelling unit is configured to merge said first plurality of instruction bytes and said second plurality of instruction bytes into a merged plurality of instruction bytes; and
      an output port coupled to said third instruction channelling unit wherein said output port is coupled to transfer said merged plurality of instruction bytes to said plurality of decode units, wherein an aligned instruction is provided to each of said plurality of decode units.

21. A superscalar microprocessor comprising:
   a plurality of decode units;
   an instruction cache; and
   an instruction alignment unit for aligning variable byte length instructions coupled between said instruction cache and said plurality of decode units, wherein said instruction alignment unit includes:
      a first instruction channelling unit coupled to said instruction cache and configured to select first instructions from a first group of instruction bytes and to place said first instructions into a first group of issue positions;
      a second instruction channelling unit coupled to said instruction cache and configured to select second instructions from a second group of instruction bytes and to place said second instructions into a second group of issue positions; and
      a third instruction channelling unit having a first input coupled to said first group of issue positions and a second input coupled to said second group of issue positions wherein said third instruction channelling unit is configured to merge said first instructions from said first group of issue positions and said second instructions from said second group of issue positions, thereby forming a third group of issue positions including at least said first instructions, wherein said third group of issue positions are coupled to provide aligned instructions to said plurality of decode units.

22. The superscalar microprocessor as recited in claim 21 further comprising a fourth instruction channeling unit configured to select third instructions from a third group of instruction bytes and to place said third instructions into a fourth group of issue positions.

23. The superscalar microprocessor as recited in claim 22 further comprising a fifth instruction channeling unit coupled to said fourth group of issue positions, wherein said fifth instruction channeling unit is configured to place said third instructions into a fifth group of issue positions, and wherein each of said third instructions is shifted from a particular position within said fourth group of issue positions to a different position within said fifth group of issue positions, and wherein said fifth instruction channeling unit selects said different position in response to a first number of said first instructions.

24. The superscalar microprocessor as recited in claim 23 further comprising a sixth instruction channeling unit coupled to said third group of issue positions and said fifth group of issue positions, wherein said sixth instruction channeling unit is configured to merge fourth instructions within said third group of issue positions and fifth instructions within said fifth group of issue positions, thereby forming a sixth group of issue positions including at least said fourth instructions.

25. The superscalar microprocessor as recited in claim 24, wherein each one of said sixth group of issue positions corresponds to a different one of said plurality of decode units.

26. A superscalar microprocessor comprising:
   a plurality of decode units;
   an instruction cache for storing variable byte length instructions; and an instruction alignment unit for aligning said variable byte length instructions, wherein said instruction alignment unit is coupled between said instruction cache and said plurality of decode units, and wherein said instruction alignment unit is coupled to receive a first group of instruction bytes and a second group of instruction bytes from said instruction cache, and wherein said instruction alignment unit is configured to select instructions from said first group of instruction bytes into a first group of issue positions and to concurrently select instructions from said second group of instruction bytes into a second group of issue positions, and wherein said instruction alignment unit is configured to shift instructions within said second group of issue positions by a number of positions equal to a number of instructions within said first group of issue positions and to merge the instructions within said second group of issue positions subsequent to shifting said second group of issue positions with instructions within said first group of issue positions, thereby creating a third group of issue positions, wherein said third group of issue positions are coupled to provide aligned instructions to said plurality of decode units.

27. The superscalar microprocessor as recited in claim 26 wherein said instruction alignment unit is coupled to receive a third group of instruction bytes from said instruction cache and to select instructions from said third group of instruction bytes into a fourth group of issue positions concurrent with selecting instructions from said first group of instruction bytes and said second group of instruction bytes.

28. The superscalar microprocessor as recited in claim 27 wherein said instruction alignment unit is configured to shift instructions within said fourth group of issue positions by said number of positions equal to said number of instructions within said first group of issue positions concurrent with shifting said second group of issue positions by said number of positions, thereby creating a fifth group of issue positions.

29. The superscalar microprocessor as recited in claim 28 wherein said instruction alignment unit is configured to shift said instructions within said fifth group of issue positions by an additional number of positions equal to a number of instructions within said second group of issue positions and to merge the instructions within said fifth group of issue positions subsequent to shifting with instructions within said third group of issue positions, thereby forming a sixth group of issue positions.

30. The superscalar microprocessor as recited in claim 29 wherein said instruction alignment unit is configured to route each instruction within said sixth group of issue positions to a corresponding one of said plurality of decode units.

\* \* \* \* \*